US006816651B2

(12) United States Patent
Kashihara et al.

(10) Patent No.: US 6,816,651 B2
(45) Date of Patent: Nov. 9, 2004

(54) ARRAYED WAVEGUIDE GRATING OPTICAL MULTIPLEXER/DEMULTIPLEXER AND METHOD FOR MANUFACTURING THE SAME

(75) Inventors: Kazuhisa Kashihara, Chiyoda-ku (JP); Kazutaka Nara, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/703,608

(22) Filed: Nov. 10, 2003

(65) Prior Publication Data

US 2004/0120645 A1 Jun. 24, 2004

Related U.S. Application Data

(63) Continuation of application No. 09/836,354, filed on Apr. 18, 2001, now Pat. No. 6,671,433.

(30) Foreign Application Priority Data

Apr. 18, 2000 (JP) ........................................ 2000-116089
Mar. 30, 2001 (JP) ........................................ 2001-100480

(51) Int. Cl.⁷ .............................................. G02B 6/34
(52) U.S. Cl. ...................................................... 385/37
(58) Field of Search ............................. 385/37, 15, 28, 385/24

(56) References Cited

U.S. PATENT DOCUMENTS

| 5,629,992 | A | 5/1997 | Amersfoort et al. |
| 5,748,811 | A | 5/1998 | Amersfoort et al. |
| 6,195,482 | B1 | 2/2001 | Dragone |
| 6,442,314 | B2 | 8/2002 | Nara et al. |
| 6,490,395 | B1 | 12/2002 | Nara et al. |
| 6,501,882 | B2 | 12/2002 | Kashihara et al. |
| 6,563,986 | B2 | 5/2003 | Kashihara et al. |
| 6,567,587 | B2 | 5/2003 | Kashihara et al. |
| 6,668,116 | B2 | 12/2003 | Nekado et al. |

FOREIGN PATENT DOCUMENTS

| EP | 0 484 878 | 5/1992 |
| EP | 0 881 512 A2 | 12/1998 |
| EP | 1 113 297 | 7/2001 |
| FR | 2 742 882 | 6/1997 |
| JP | 05-313029 | 11/1993 |
| JP | 9-297225 | 11/1994 |
| JP | 8-122557 | 5/1996 |
| JP | 11-133253 | 5/1999 |
| JP | 11-160556 | 6/1999 |
| JP | 11-218624 | 8/1999 |
| JP | 2001-350041 | 12/2001 |
| JP | 2003-513330 | 4/2003 |
| WO | WO 01/33270 | 5/2001 |

OTHER PUBLICATIONS

J. B. D. Soole, et al., IEEE Photonics Technology Letters, vol. 8, No. 10, XP–000628952, pp. 1340–1342, "Use of Multimode Interference Couplers to Broaden the Passband of Wavelength–Dispersive Integrated WDM Filters", Oct. 1, 1996.

R. M. Lorenzo, et al., IEE Proceedings: Optoelectronics, vol. 145, No. 1, XP–006011325, pp. 65–69, "Improved Self–Imaging Characteristics in 1×N Multimode Couplers", Feb. 20, 1998.

*Primary Examiner*—Robert H. Kim
*Assistant Examiner*—Richard H Kim
(74) *Attorney, Agent, or Firm*—Oblon, Spivak, McClelland, Maier & Neustadt, P.C.

(57) ABSTRACT

An arrayed waveguide grating optical multiplexer/demultiplexer is configured to multiplex a plurality of lights having different wavelengths with a designed wavelength spacing and to demultiplex a light into a plurality of lights having different wavelengths with the designed wavelength spacing. The designed wavelength spacing is determined such that a value which is obtained by multiplying the designed wavelength spacing by an integer which is at least two is substantially equal to an actual wavelength spacing of lights which are input to or output from the multiplexer/demultiplexer.

23 Claims, 8 Drawing Sheets

ARRAYED WAVEGUIDE GRATING OPTICAL MULTIPLEXER/DEMULTIPLEXER AND METHOD FOR MANUFACTURING THE SAME

CROSS-REFERENCES TO RELATED APPLICATIONS

The present application relates to Japanese Patent Application No. 2000-116089, filed Apr. 18, 2000, entitled "Arrayed Waveguide Grating Optical Multiplexer/Demultiplexer and Method for Using the Same," and Japanese Patent Application No. 2001-100480, filed Mar. 30, 2001, entitled "Arrayed Waveguide Grating Optical Multiplexer/Demultiplexer." The contents of these applications are incorporated herein by reference in their entirety.

BACKGROUND OF THE INVENTION

1. Field of the Invention

The present invention relates to an arrayed waveguide grating optical multiplexer/demultiplexer and a method for manufacturing and using the arrayed waveguide grating optical multiplexer/demultiplexer.

2. Discussion of the Background

In recent years, in the field of optical communications, research and development in wavelength division multiplexing (WDM) transmission systems as a method for increasing the transmission capacity drastically have been actively pursued and the practical application is now advancing. The wavelength division multiplexing transmission systems, for example, multiplex a plurality of lights each having a different wavelength from each other and transmit the multiplexed light. In such wavelength division multiplexing transmission systems, an optical multiplexer/demultiplexer is required to multiplex a plurality of lights each having a different wavelength from each other and to demultiplex the multiplexed light to a plurality of lights each having a different wavelength from each other.

As an example of the optical multiplexer/demultiplexer, an arrayed waveguide grating (AWG) optical multiplexer/demultiplexer is known. Referring to FIG. 7A, an arrayed waveguide grating optical multiplexer/demultiplexer includes a substrate 11 and an optical waveguide unit 10 formed on the substrate 11. The optical waveguide unit 10 has a waveguide such as shown for example in FIG. 7A.

The arrayed waveguide grating optical multiplexer/demultiplexer includes one or more optical input waveguides 12 arranged side by side, a first slab waveguide 13 connected to the output ends of the optical input waveguides 12, an arrayed waveguide 14 connected to the output end of the first slab waveguide 13, a second slab waveguide 15 connected to the output end of the arrayed waveguide 14, a plurality of optical output waveguides 16 connected to the output end of the second slab waveguide 15 arranged side by side. The arrayed waveguide 14 includes a plurality of channel waveguides (14a) arranged side by side.

Each of the aforementioned channel waveguides (14a), which propagates the light outputted from the first slab waveguide 13, is formed of a predetermined different length from each other.

The optical input waveguide 12 or the optical output waveguide 16 is, for example, provided corresponding to the number of the signal lights each having a different wavelength from each other, for example, demultiplexed by arrayed waveguide grating optical multiplexer/demultiplexer. The channel waveguides (14a) are generally provided so many as for example 100 waveguides. But, for the purpose of simple illustration, the number of the waveguides of each waveguide (12, 14a, 16) is schematically shown in FIG. 7A. In addition, the arrayed waveguide grating optical multiplexer/demultiplexer is formed substantially symmetrical with respect to the broken line (C) in the drawing.

FIG. 7B shows the enlarged schematic view within the frame (A) depicted by dotted line in FIG. 7A. As shown in this figure, in the conventional arrayed waveguide grating optical multiplexer/demultiplexer, the output ends of the optical input waveguides 12 of a curved shapes are directly connected to the input side of the first slab waveguide 13. In addition, the input ends of the optical output waveguides 16 of curved shapes are directly connected to the output side of the second slab waveguide 15 likewise.

SUMMARY OF THE INVENTION

According to one aspect of the present invention, an arrayed waveguide grating optical multiplexer/demultiplexer includes at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. The arrayed waveguide includes a plurality of channel waveguides each of which has a different length. The optical multiplexer/demultiplexer is configured to multiplex a plurality of lights having different wavelengths with a designed wavelength spacing and to demultiplex a light into a plurality of lights having different wavelengths with the designed wavelength spacing. The designed wavelength spacing is determined such that a value which is obtained by multiplying the designed wavelength spacing by an integer which is at least two is substantially equal to an actual wavelength spacing of lights which are input to or output from the multiplexer/demultiplexer.

According to another aspect of the present invention, a method for manufacturing an arrayed waveguide grating optical multiplexer/demultiplexer includes providing at least one first optical waveguide, providing a first slab waveguide and providing an arrayed waveguide connected to the at least one first optical waveguide via the first slab waveguide. The arrayed waveguide includes a plurality of channel waveguides each of which has a different length. The method further includes providing a second slab waveguide and providing a plurality of second optical waveguides connected to the arrayed waveguide via the second slab waveguide. The optical multiplexer/demultiplexer is constructed to multiplex a plurality of lights having different wavelengths with a designed wavelength spacing and to demultiplex a light into a plurality of lights having different wavelengths with the designed wavelength spacing. The designed wavelength spacing is determined such that a value which is obtained by multiplying the designed wavelength spacing by an integer which is at least two is substantially equal to an actual wavelength spacing of lights which are input to or output from the multiplexer/demultiplexer.

According to further aspect of the present invention, a method for using an arrayed waveguide grating optical multiplexer/demultiplexer includes providing the arrayed waveguide grating optical multiplexer/demultiplexer. The optical multiplexer/demultiplexer includes at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. The arrayed waveguide has a plurality of channel waveguides each of which has a different length. The optical multiplexer/demultiplexer is configured to multiplex a plurality of lights having different wavelengths with a designed wavelength spacing and to demultiplex a light into a plurality of lights having different wavelengths with the designed wavelength spacing. A light having different wavelengths with an actual wavelength spacing is inputted to the at least one first optical waveguide or are outputted from the plurality of second optical waveguides. The actual wavelength spacing is substantially equal to a value obtained by multiplying the designed wavelength spacing by an integer which is at least two.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE EMBODIMENTS

Figure 1A:
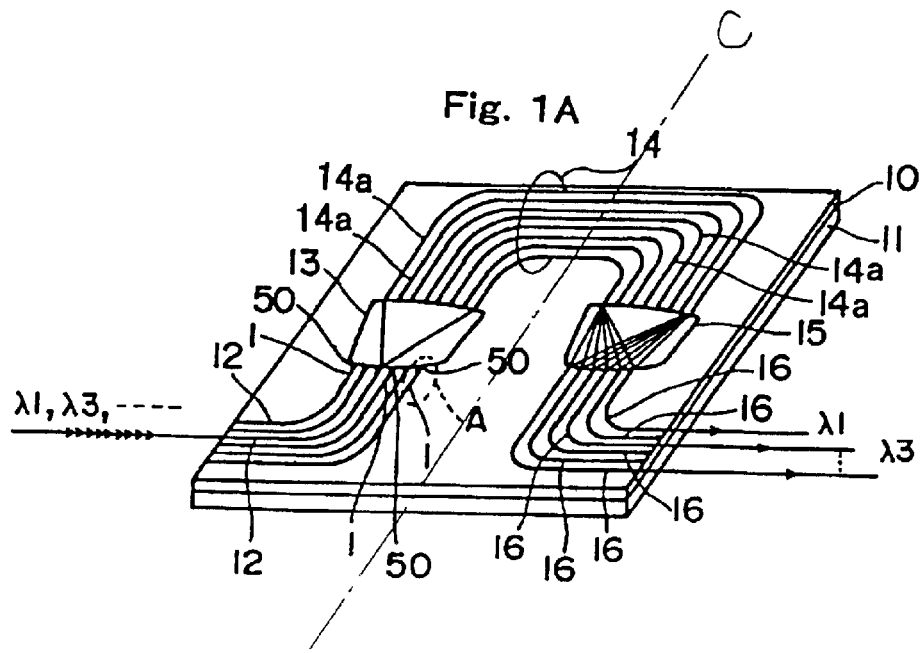
FIG. 1A is a block diagram of the arrayed waveguide grating optical multiplexer/demultiplexer according to a first embodiment of the present invention.

The embodiments will now be described with reference to the accompanying drawings, wherein like reference numerals designate corresponding or identical elements throughout the various drawings.

As an example of the optical multiplexer/demultiplexer, an arrayed waveguide grating (AWG) optical multiplexer/demultiplexer is known. Referring to FIG. 1A, an arrayed waveguide grating optical multiplexer/demultiplexer includes a substrate 11 and an optical waveguide unit 10 formed on the substrate 11. The optical waveguide unit 10 has a waveguide such as shown for example in FIG. 1A.

The arrayed waveguide grating optical multiplexer/demultiplexer includes one or more optical input waveguides 12 arranged side by side, a first slab waveguide 13 connected to the output ends of the optical input waveguides 12, an arrayed waveguide 14 connected to the output end of the first slab waveguide 13, a second slab waveguide 15 connected to the output end of the arrayed waveguide 14, a plurality of optical output waveguides 16 connected to the output end of the second slab waveguide 15 arranged side by side. The arrayed waveguide 14 includes a plurality of channel waveguides (14a) arranged side by side.

Each of the aforementioned channel waveguides (14a), which propagates the light outputted from the first slab waveguide 13, is formed of a predetermined different length from each other.

The optical input waveguide 12 or the optical output waveguide 16 is, for example, provided corresponding to the number of the signal lights each having a different wavelength from each other, for example, demultiplexed by arrayed waveguide grating optical multiplexer/demultiplexer. The channel waveguides (14a) are generally provided as many as, for example, 100 waveguides. But, for the purpose of simple illustration, the number of the waveguides of each waveguide (12, 14a, 16) is schematically shown in FIG. 1A. In addition, the arrayed waveguide grating optical multiplexer/demultiplexer is formed substantially symmetrical with respect to the broken line (C) in the drawing.

The optical input waveguides 12 are, for example, connected to the optical fibers of the transmitting side so that the light which has undergone wavelength division multiplexing is introduced therein. The light introduced to the first slab waveguide 13 through one of the optical input waveguides 12 is diffracted by means of the diffraction effect, inputs into each of the plurality of channel waveguides (14a) and propagates through the arrayed waveguide 14.

The light propagating through the arrayed waveguide 14 reaches the second slab waveguide 15 and further condensed into the optical output waveguide 16 thereby being outputted. As the length of each channel waveguide (14a) differs with each other by a predetermined length, a phase shift is generated in each light after having propagated through each channel waveguide (14a) and so the phase-front of the lights inclines corresponding to the predetermined length. As the focusing position of the light is determined in accordance with the angle of the inclination, the focusing position of the light having different wavelength differs with each other. Hence, by forming the optical output waveguide 16 at the focusing position of the light of each wavelength, it is made possible to output lights each having a different wavelength from each other by a predetermined designed wavelength spacing from the respective optical output waveguide 16 corresponding to each wavelength.

For example as shown in FIG. 1A, when the light which has undergone wavelength division multiplexing having different wavelengths $\lambda1, \lambda2, \lambda3, \ldots \lambda n$ (n is an integer more than 1) from each other by a predetermined designed wavelength spacing is inputted from one optical input waveguide 12, the light is diffracted by the first slab waveguide 13 and reaches the arrayed waveguide 14. Then, it propagates further through the arrayed waveguide 14 and slab waveguide 15 and focuses as described above to the different positions depending on their wavelengths, thereby the lights having the different wavelengths input into the optical output waveguides 16, respectively. Further, they propagate through the respective optical output waveguides 16 and outputted from output end of the optical output waveguides 16. The aforementioned lights of each wavelength are output through optical fibers which are connected to the output ends of optical output waveguides 16, respectively.

In addition, as the arrayed waveguide grating uses the light reciprocal (reversibility) principle, it has not only a function as an optical demultiplexer but also has a function as an optical multiplexer. In other words, to the contrary as shown in FIG. 1A, when a plurality of different lights having different wavelengths from each other by a predetermined wavelength are inputted from respective optical output waveguides 16, these lights pass through from the optical output waveguides 16 to the one optical input waveguide 12 via the second slab waveguide 15, the arrayed waveguide 14 and the first slab waveguide 13. Thus, these lights are multiplexed and a light having the different wavelengths is outputted from the single optical input waveguide 12.

In this arrayed waveguide grating optical multiplexer/demultiplexer, the wavelength resolution of the arrayed waveguide grating is in proportion to the length difference (ΔL) of the respective channel waveguides (4a) of the arrayed waveguide 4. Accordingly, by increasing the length difference (ΔL), multiplexing lights and demultiplexing a light with a narrow wavelength spacing can be achieved, that has not been achieved in the conventional multiplexer/demultiplexer. Therefore, the arrayed waveguide grating can exhibit the function for multiplexing signal lights and demultiplexing a signal light, which is required for achieving the high-density optical wavelength division multiplexing transmission, that is, the function for demultiplexing a signal light and multiplexing a plurality of signal lights having a wavelength spacing of at most approximately 1 nm.

Generally, as for the arrayed waveguide grating optical multiplexer/demultiplexer, the transmitting wavelength of the light (wavelength of the light to be demultiplexed or multiplexed) varies greatly in accordance with the change in the outside environmental temperature. Therefore, when the outside environmental temperature changes, the arrayed waveguide grating optical multiplexer/demultiplexer cannot precisely multiplex or demultiplex lights having desired wavelengths.

Conventionally, Peltier device and the like have been employed in order to reduce the wavelength shift of the transmitting light due to the temperature change by keeping the temperature of the arrayed waveguide grating optical multiplexer/demultiplexer at a predetermined constant temperature. However, in this arrayed waveguide grating optical multiplexer/demultiplexer, because the Peltier device and a temperature control circuit are necessary, the manufacturing cost of the arrayed waveguide grating optical multiplexer/demultiplexer increases and moreover the electricity is required for the temperature control.

According to an embodiment of the present invention, the arrayed waveguide grating optical multiplexer/demultiplexer has, for example, an optical demultiplexing function to demultiplex a light having different wavelengths (for example, $\lambda 1, \lambda 2, \lambda 3, \ldots \lambda n$) to lights having different wavelengths from each other by a predetermined wavelength spacing.

Figure 8A:
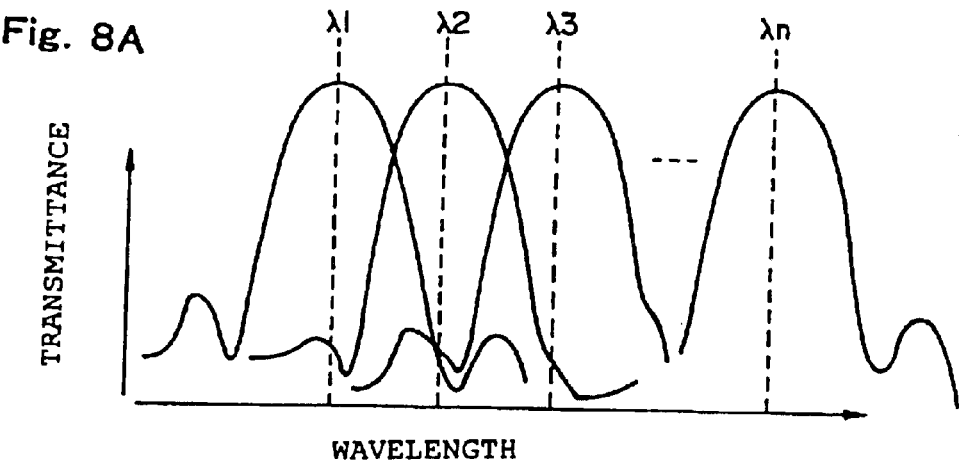
FIGS. 8A, 8B and 8C are graphs each showing in a condition for comparing the light transmitting characteristics of the light of each wavelength in the arrayed waveguide grating optical multiplexer/demultiplexer.
Figure 8B:
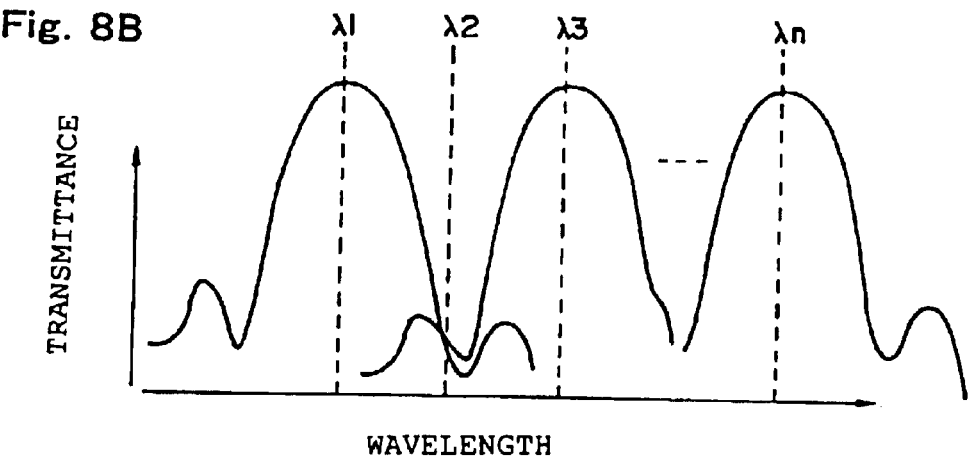
Figure 8C:
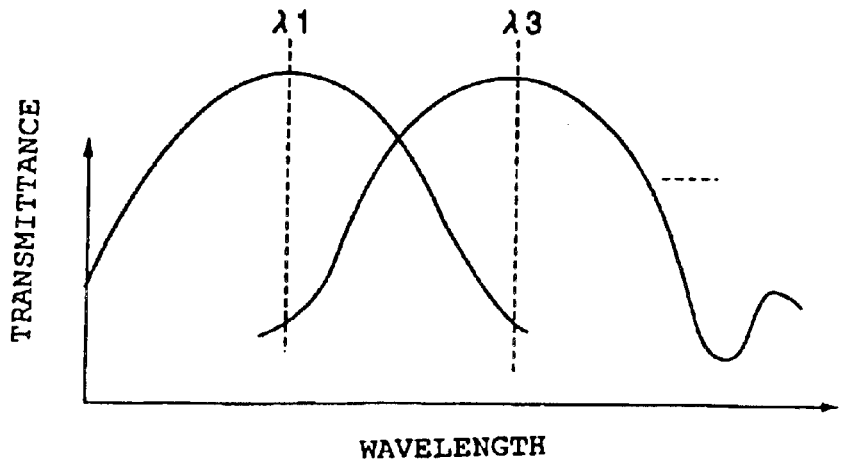

The conventional arrayed waveguide grating optical multiplexer/demultiplexer, whose optical transmitting wavelength characteristics are shown, for example in FIG. 8C, multiplexes lights having different wavelengths (for example, $\lambda 1, \lambda 3, \ldots$) from each other by a predetermined designed wavelength spacing and demultiplexes a light into a plurality of lights having different wavelengths (e.g. $\lambda 1, \lambda 3, \ldots$) from each other. The optical transmitting wavelength characteristics of this arrayed waveguide grating optical multiplexer/demultiplexer have a large overlap of spectrum centered around each center of the light transmitting wavelength so that it is difficult to improve the crosstalk at the range of the adjacent transmitting wavelength (hereinafter referred to as "adjacent crosstalk").

On the other hand, according to one embodiment of the present invention, an arrayed waveguide grating optical multiplexer/demultiplexer has the optical transmitting wavelength characteristics as shown in FIG. 8A. In this arrayed waveguide grating optical multiplexer/demultiplexer, the designed wavelength is $\lambda 1, \lambda 2, \lambda 3, \ldots \lambda n$ with a designed wavelength spacing. A light which has undergone wavelength division multiplexing and which has a plurality of wavelengths (e.g., $\lambda 1, \lambda 3, \lambda 5, \ldots \lambda n$) with an actual wavelength spacing. Namely, the designed wavelength spacing is determined such that a value which is obtained by multiplying the designed wavelength spacing by an integer which is at least two is substantially equal to the actual wavelength spacing of lights which are input to or output from the multiplexer/demultiplexer. The arrayed waveguide grating optical multiplexer/demultiplexer demultiplexes the light into a plurality of lights having wavelengths different from each other by substantially the integral multiple spacing of the designed wavelength spacing. The optical transmitting wavelength characteristics are as shown in FIG. 8B.

In short, the overlaps of the spectrums centered around centers of the optical transmitting wavelengths are small and the adjacent crosstalk improves comparing to the arrayed waveguide grating optical multiplexer/demultiplexer having the optical transmitting wavelength characteristics as shown in FIG. 8C.

Namely, in the embodiment according to the present invention, an arrayed waveguide grating optical multiplexer/demultiplexer is configured to multiplex lights having different wavelengths with the frequency spacing, for example, 100 GHz (the designed wavelength spacing) and demultiplex a light to lights having different wavelengths with the frequency spacing, for example, 100 GHz. Lights having different wavelengths with frequency spacing, for example, 200 GHz (the actual wavelength spacing) are inputted to the optical output waveguides 16 and are multiplexed. The multiplexed light is inputted to the optical input waveguide 12 of the optical multiplexer/demultiplexer and is demultiplexed to lights each having different wavelength with frequency spacing, for example, 200 GHz. Thereby, the crosstalk between the adjacent wavelengths (i.e., ±0.2 nm range with respect to the adjacent wavelength) is within the range of background crosstalk so that the crosstalk is made stable.

Additionally, as described above, in the arrayed waveguide grating optical multiplexer/demultiplexer, the optical transmitting wavelength (aforementioned wavelength to be multiplexed or demultiplexed) changes according to the change in the outside environmental temperature.

Therefore, in general, it is difficult to prevent the deterioration in the characteristics, for example, radical change in loss, deterioration of adjacent crosstalk and the like due to the shift of the central wavelength, shift of the aforementioned optical transmitting wavelength (shift of center wavelength of the optical transmission) without temperature control or the like.

Hence, in addition to the aforementioned design, the transmitting spectrum of the arrayed waveguide grating optical multiplexer/demultiplexer is made to have a wide and flat leveled area extending in both of the longer wavelength side and the shorter wavelength side with respect to the central light transmitting wavelength such that the center wavelength shift due to the change in the temperature is absorbed. Accordingly, the deterioration of the characteristics due to the center wavelength shift can be mitigated. Thus, even in case that the central wavelength of the transmitting light is shifted due to the change in the outside environmental temperature, the arrayed waveguide grating optical multiplexer/demultiplexer properly works regardless of the outside environmental temperature change, because the shift is included within the flat leveled area of the wide bandwidth.

In the arrayed waveguide grating optical multiplexer/demultiplexer according to an embodiment of the present invention, the optical amplitude distribution of the light propagating, for example, from the input waveguide side toward the first slab waveguide side is changed from the Gaussian shape into a substantially rectangular shape. Accordingly, the optical amplitude distribution of the light inputted to the first slab waveguide 13 from the optical input waveguide side can be made substantially rectangular shape at the light input surface of the first slab waveguide 13. Thus, as shown in FIG. 2B, the light transmitting spectrum of the arrayed waveguide grating optical multiplexer/demultiplexer has, for example, an enlarged width of flat leveled area and moreover a good (steep) rising edge in the foot part of the spectrum.

Besides, hereby, the flatness of the spectrum around the central wavelength is improved and also the adjacent crosstalk can be further improved. Therefore, the arrayed waveguide grating optical multiplexer/demultiplexer properly operates even if the central wavelength of the transmitting light is shifted to some extent due to the change in the outside environmental temperature.

Figure 2A:
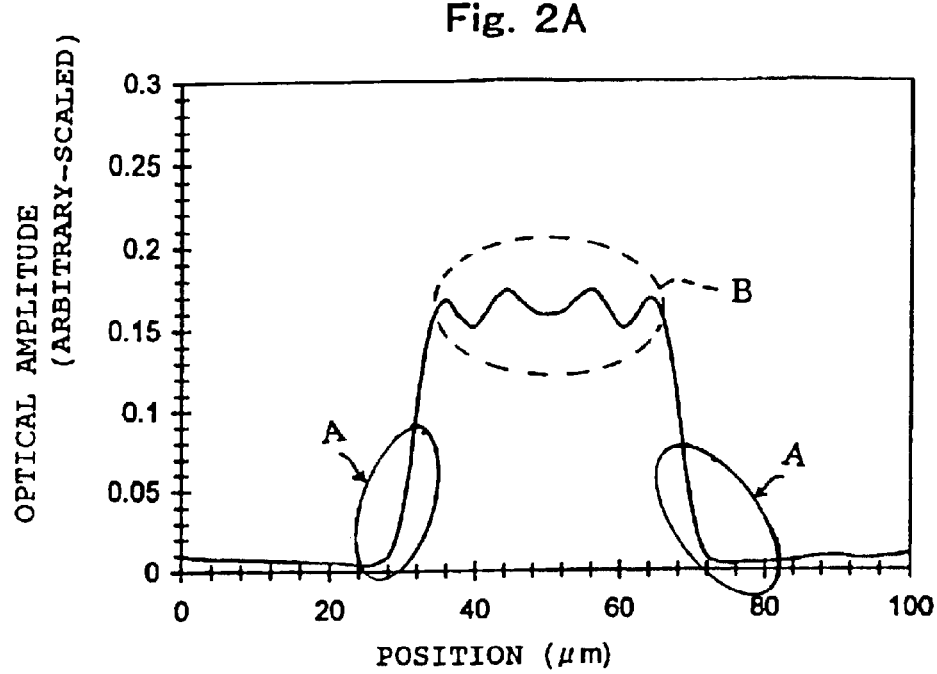
FIG. 2A is a graph showing an optical amplitude distribution of a light at the output of the speaker-shaped waveguide in the arrayed waveguide grating optical multiplexer/demultiplexer according to the first embodiment.
Figure 2B:
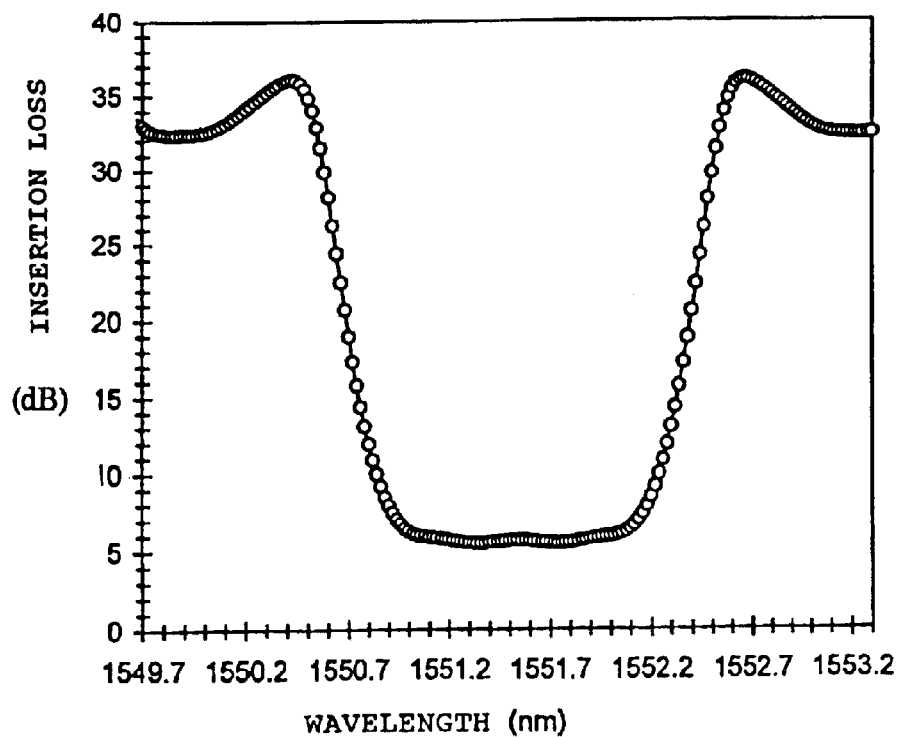
FIG. 2B is a graph showing the light transmitting characteristics of the arrayed waveguide grating optical multiplexer/demultiplexer according to the first embodiment.
Figure 5:
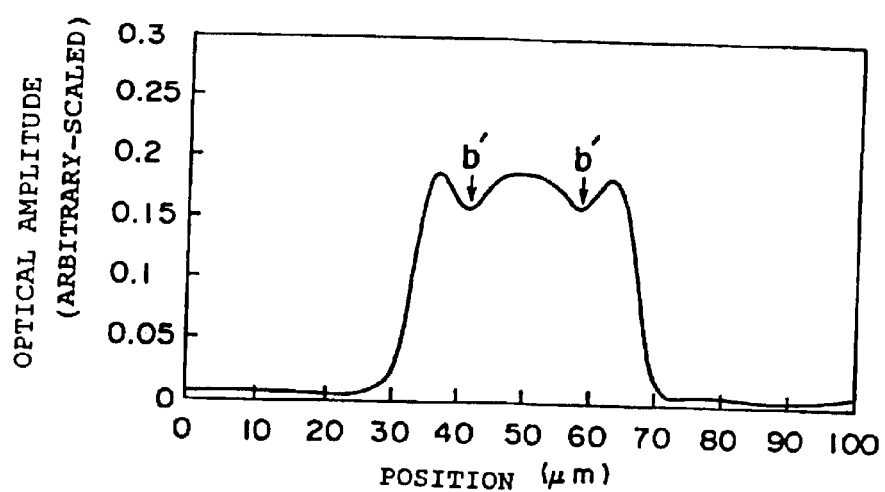
FIG. 5 is a graph showing the optical amplitude distribution at the output of the trapezoidal waveguide of the second embodiment.

The term "substantially rectangular shape" means that, for example as shown in FIG. 2A, the rising edge of the foot part (an area (A) shown in FIG. 2A) is steep and the summit area of the crest (an area (B) as shown in FIG. 2A) has a substantially flat shape which includes somewhat irregularly, for example, trough parts (b') as shown in FIG. 5.

In order to change the optical amplitude distribution of the light propagating from the input or output waveguides (12, 16) toward the first or second slab waveguides (13, 15) from the Gaussian shape into the substantially rectangular shape, a trapezoidal waveguide and/or a straight waveguide are provided between the input and/or output waveguides (12, 16) and the first and/or second slab waveguides (13, 15). The trapezoidal waveguide has a width larger than that of the corresponding optical input waveguide or optical output waveguide and increases its width toward the corresponding slab waveguide side. The straight waveguide is connected to the narrower end of the trapezoidal waveguide and has a substantially constant width which is substantially same as that of the narrower end of the trapezoidal waveguide.

The details of these waveguides are described in Japanese Patent Application No. 370602/1999, filed on Dec. 27, 1999, Japanese Patent Application No. 58646/2000, filed on Mar. 3, 2000, Japanese Patent Application No. 102473/2000, filed on Apr. 4, 2000, and Japanese Patent Application No. 285448/2000, filed on Dec. 20, 2000. The contents of these applications are incorporated herein by reference in their entirety.

By forming the optical amplitude distribution of the light incident onto the corresponding slab waveguide from the optical input waveguide side or the optical output waveguide side in a substantially rectangular shape, the flatness of the spectrum around the central wavelength is improved as described above to enlarge the 1 dB bandwidth and it becomes possible to provide an arrayed waveguide grating optical multiplexer/demultiplexer having a low adjacent crosstalk.

Therefore, according to the arrayed waveguide grating optical multiplexer/demultiplexer as an embodiment of the present invention, an arrayed waveguide grating optical multiplexer/demultiplexer which has wide 1 dB bandwidth of the transmitting spectrum and the low crosstalk may be obtained.

Hence, in addition to the improvement of the adjacent crosstalk, lights or a light is multiplexed or demultiplexed with stability regardless of the change in the outside environmental temperature.

Figure 1B:
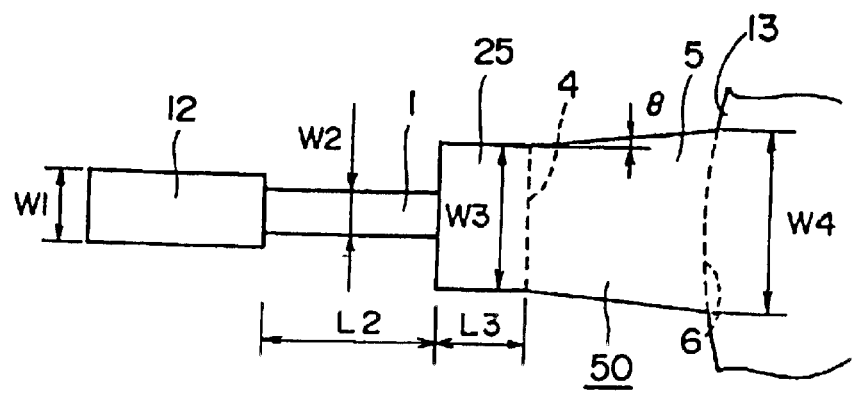
FIG. 1B is an enlarged illustration of an area A part in FIG. 1A.

FIG. 1B is an enlarged view of an area "A" encircled by a dotted line shown in FIG. 1A. Referring to FIG. 1B, for example, the output end of each optical input waveguide 12 is connected to the first slab waveguide 13 via a narrow straight waveguide 1 and a speaker-shaped waveguide 50. The speaker-shaped waveguide 50 includes a trapezoidal wavelength 5 and a straight waveguide equal width part 25. The trapezoidal wavelength 5 has a width which is larger than that of the optical input waveguide 12 and which increases toward the corresponding (connection couple) slab waveguide (first slab waveguide 13). The narrower end of the trapezoidal shape waveguide 5 is provided with the straight waveguide equal width part 25 which has the same width as that of the narrower end of the trapezoidal wavelength 5.

The narrow straight waveguide 1 has a width narrower than that of the optical input waveguide 12 and connects the straight waveguide equal width part 25 of the speaker-shaped waveguide 50 and the optical input waveguide 12.

In the first embodiment, the speaker-shaped waveguide 50 operates as a substantially rectangular shape optical amplitude distribution forming waveguide that changes the optical amplitude distribution of the light propagating from each optical input waveguide 12 toward the first slab waveguide 13 from a Gaussian shape to a substantially rectangular shape.

To be more specific, the speaker-shaped waveguide 50 includes a trapezoidal waveguide 5 and a straight waveguide equal width part 25. The narrower end (an upper base) of the trapezoidal shape waveguide 5 has a width (W3). The width of the straight waveguide equal width part 25 is equal to the width (W3) of the narrower end of the trapezoidal shape waveguide 5. The width (W3) of the straight waveguide equal width part 25 is larger than the width (W1) of the optical input waveguide 12. The length of the straight waveguide equal width part 25 is L3. The trapezoidal waveguide 5 enlarges its width by an angle θ. The lower base 6 of the trapezoidal waveguide 5 is slightly curved and the width of this base 6 is W4.

Additionally, the center of each narrow straight waveguide 1 is aligned with the lateral center of the input end of the corresponding straight waveguide equal width part 25. Each aforementioned narrow straight waveguide 1 operates as a light power center position adjusting unit that moves the power center of the light signal propagated through the optical input waveguide 12 to the lateral center of the narrow straight waveguide 1 so as to align the power center of the light signal with the lateral center of the light incident end of the straight waveguide equal width part 25. The width of the narrow straight waveguide 1 is W2 and its length is L2.

In the first embodiment, the aforementioned parameters are set as follows. That is, the width W1 of the optical input waveguide 12 is 6.5 μm, the width W2 of the narrow straight waveguide 1 is 3.0 μm, the length L2 of the narrow straight waveguide is 500 μm, the width W3 of the straight waveguide of equal width part 25 (width of the narrower end of the speaker-shaped waveguide 50) is 24.5 μm, the length L3 of the straight waveguide of equal width part 25 is 250 μm, the angle θ is 0.4° and the width W4 of the base of the trapezoidal waveguide 5 (width of the wider end of the speaker-shaped waveguide 50) is 37.9 μm. In addition, the height of the core forming each waveguide is 6.5 μm and the relative refractive index difference Δ of the core with respect to the cladding of each waveguide is 0.8%.

The arrayed waveguide grating optical multiplexer/demultiplexer according to the first embodiment of the present invention is constructed to demultiplex a multiplexed light into a plurality of lights having different wavelengths with a predetermined designed frequency spacing (wavelength spacing), for example, about 100 GHz (about 0.8 nm) and to multiplex a plurality of lights having different wavelengths with a predetermined designed frequency spacing (wavelength spacing), for example, about 100 GHz (about 0.8 nm).

In the first embodiment, a plurality of lights having different wavelengths with the actual frequency spacing (for example, about 200 GHz: about 1.6 nm) which is integer times, for example, twice, as large as the designed frequency spacing (for example, about 100 GHz: about 0.8 nm) are inputted to the arrayed waveguide grating optical multiplexer/demultiplexer according to the first embodiment of the present invention and are multiplexed. Alternatively, a multiplexed light is inputted to the arrayed waveguide grating optical multiplexer/demultiplexer and is demultiplexed to a plurality of lights having different wavelengths with the actual frequency spacing (for example, about 200 GHz: about 1.6 nm) which is integer times, for example, twice, as large as the designed frequency spacing (for example, about 100 GHz: about 0.8 nm).

Incidentally, on determining the construction and the design of the arrayed waveguide grating optical multiplexer/demultiplexer according to the first embodiment of the present invention, the following consideration was taken into account. The inventors considered that the crosstalk at the adjacent wavelengths (i.e. ±0.2 nm range with respect to the adjacent wavelength) can be set within the background crosstalk and stable crosstalk can be obtained when a plurality of lights having different wavelengths with a frequency spacing which is integer times as large as the designed frequency spacing are inputted to the arrayed waveguide grating optical multiplexer/demultiplexer or a multiplexed light is inputted to the arrayed waveguide grating optical multiplexer/demultiplexer to be demultiplexed to a plurality of lights having different wavelengths with a frequency spacing which is integer times as large as the designed frequency spacing.

The 1 dB bandwidth is enlarged to absorb the central wavelength shift due to the change in the outside environmental temperature. Accordingly, the flatness of the spectrum around the central wavelength within the transmitting spectrum of the arrayed waveguide grating optical multiplexer/demultiplexer is improved. Therefore, the arrayed waveguide grating optical multiplexer/demultiplexer realizes a high quality wavelength division multiplexing communications even if the central wavelength of the transmitting light is slightly shifted due to the change in the outside environmental temperature.

Furthermore, the rising edge of the foot part of the transmitting spectrum waveform of the arrayed waveguide grating optical multiplexer/demultiplexer is improved or steepened in order to improve the adjacent crosstalk.

The speaker-shaped waveguide 50 is provided at the output end of each optical input waveguide 12. Accordingly, the optical amplitude distribution of the light toward the first slab waveguide 13 is changed from the Gaussian shape to the substantially rectangular shape, thereby enlarging the 1 dB bandwidth and improving the rising edge of the foot part of the transmitting spectrum waveform having a central wavelength of the transmitting light of the arrayed waveguide grating optical multiplexer/demultiplexer.

To be concrete, the arrayed waveguide grating optical multiplexer/demultiplexer according to the first embodiment of the present invention is designed in a manner as described below. The central wavelength of the transmitting light of the arrayed waveguide grating optical multiplexer/demultiplexer is substantially equal to for example, the ITU grid wavelength as the set wavelength within the operating temperature. Therefore, first of all, the central wavelength of the transmitting light is designed to be substantially equal to the ITU grid wavelength at 35° C., which is the central temperature of the operating temperature (0° C. to 70° C.) for arrayed waveguide grating optical multiplexer/demultiplexer.

In addition, considering the temperature dependency (0.011 nm/° C.) of the central wavelength of the transmitting light of the arrayed waveguide grating optical multiplexer/demultiplexer, the shift amount of the central wavelength of the transmitting light is 0.77 nm as the temperature changes 0 to 70° C. The passband of the central wavelength of the transmitting light is designed to be wider than the variation of the central wavelength due to the temperature change. Hence, since the 1 dB bandwidth which wavelength division multiplexing communications system requires is about 0.3 nm, 1.1 nm is obtained by adding 0.3 nm to the shift amount of 0.77 nm. Accordingly, the arrayed waveguide grating optical multiplexer/demultiplexer is designed such that the 1 dB bandwidth is at least approximately 1.1 nm.

In addition, in case of multiplexing lights having different wavelengths with frequency spacing of 200 GHz or demultiplexing a light into lights having different wavelengths with frequency spacing of 200 GHz, the adjacent crosstalk is usually the worst crosstalk within the range of the adjacent wavelength (the frequency spacing (in the present embodiment; ±1.6 nm) plus ±0.2 nm with respect to the central wavelength). Therefore, considering the temperature dependency of the central wavelength of the transmitting light (shift amount of the central wavelength of the transmitting light), 0.77 nm/2 (=0.385 nm) is further added. Accordingly, the arrayed waveguide grating optical multiplexer/demultiplexer is designed such that the worst crosstalk within the wavelength range of ±(1.6 nm±0.6) nm becomes at most about −26 dB which the wavelength division multiplexing communications system requires.

As the result, the arrayed waveguide grating optical multiplexer/demultiplexer of the first embodiment has the a aforementioned waveguide construction in which each parameter is formed as described above, and as shown in for example FIG. 2B, the arrayed waveguide grating optical multiplexer/demultiplexer is constructed in which the 1 dB bandwidth is 1.14 nm, the ripple is 0.2 dB, the crosstalk (in this case, the worst crosstalk measured within the range of the wavelength of ±(1.6±0.6) nm with respect to the central wavelength of the transmitting light) is minus 27 dB.

According to the first embodiment of the present invention, the designed frequency spacing of the lights which are to be multiplexed or into which a multiplexed light is to be demultiplexed by the arrayed waveguide grating optical multiplexer/demultiplexer is designed to be approximately 100 GHz. The frequency spacing of the inputted lights or the outputted lights is 200 GHz. Further, the speaker-shaped waveguide 50 is provided at the output end of each optical input waveguide 12. Accordingly, the flatness of the transmitting spectrum of the arrayed waveguide grating optical multiplexer/demultiplexer is improved and a sufficient isolation can be achieved even if the central wavelength of the transmitting light shifts to some extent due to the change in the outside environmental temperature of the arrayed waveguide grating optical multiplexer/demultiplexer.

As the result, it is made possible to perform an optical multiplexing/demultiplexing of the lights of the ITU grid wavelength with stability without depending on the outside environmental temperature and also to improve the adjacent crosstalk of the arrayed waveguide grating optical multiplexer/demultiplexer enabling a high quality wavelength division multiplexing communications.

Next, an arrayed waveguide grating optical multiplexer/demultiplexer according to a second embodiment of the present invention is described.

Figure 3:
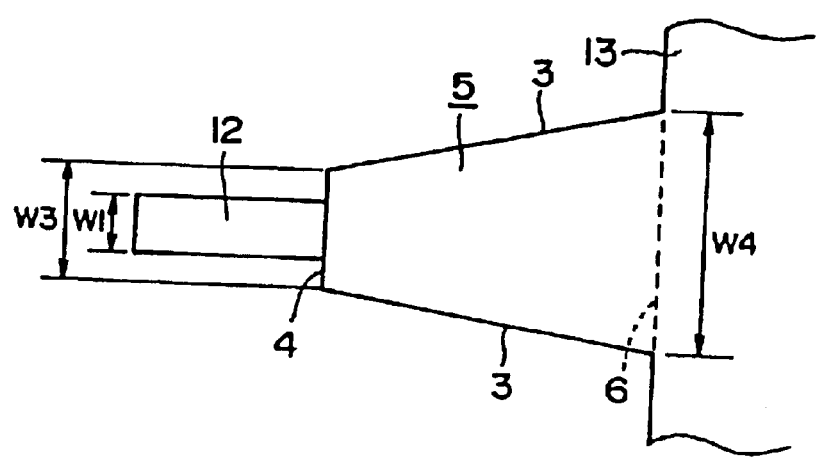
FIG. 3 is a block diagram showing the output end of the optical input waveguide of the arrayed waveguide grating optical multiplexer/demultiplexer according to a second embodiment of the present invention.

In FIG. 3, a connection structure between the output end of each optical input waveguide 12 and the first slab waveguide 13 is illustrated. Referring to FIG. 13, the optical input waveguide 12 is connected to the first slab waveguide 13 via the trapezoidal waveguide 5 which operates as a substantially rectangular optical amplitude distribution forming waveguide.

In the second embodiment, the optical input waveguide 12 is designed such that the center position of the intensity of the light propagating through the optical input waveguide 12 does not shift from the lateral center of the optical input waveguides 12. Therefore, even without the narrow straight waveguide provided in the aforementioned first embodiment, the center position of the intensity of the light propagating through the optical input waveguide 12 is inputted to the lateral center of the narrow end (upside 4) of the trapezoidal waveguide 5.

In addition, the speaker-shaped waveguide 50 and the trapezoidal waveguide 5 are almost the same with respect to their function and consequently the optical amplitude distribution of the light can be changed adequately by the trapezoidal waveguide 5. Therefore, in the arrayed waveguide grating optical multiplexer/demultiplexer according to the second embodiment, the flatness of the spectrum around the central wavelength can be improved like the aforementioned first embodiment.

Figure 4:
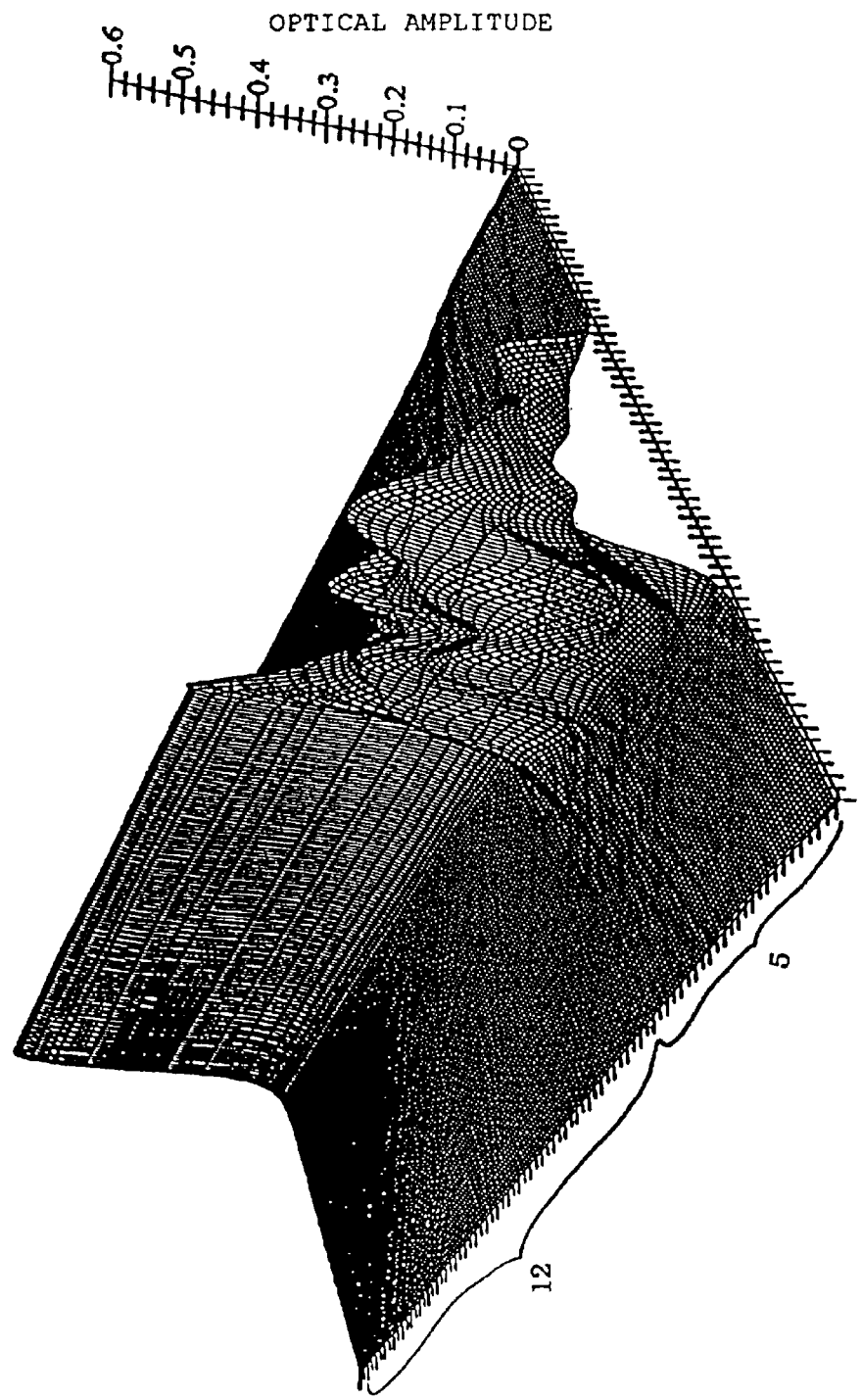
FIG. 4 is an illustration showing in three dimension of the optical amplitude distribution of light propagating through the optical input waveguide and the trapezoidal waveguide in the second embodiment.

To be more specific, in the second embodiment, as shown in FIG. 4, the light passing through the optical input waveguide 12 has the optical amplitude distribution of the Gaussian shape. The light is inputted to the trapezoidal waveguide 5 and the light propagates changing its optical amplitude distribution within the trapezoidal waveguide 5. On that occasion, the foot part of the optical amplitude distribution of the light is cut down as the light propagates, and the light as a whole propagates expanding its distribution width to form a substantially rectangular shape. Then, it forms a shape shown in FIG. 5 at the light output end (base 6) of the trapezoidal waveguide 5 so that the flatness of the spectrum around the central wavelength can be improved like the aforementioned first embodiment.

In the second embodiment, parameters forming the waveguide construction of the arrayed waveguide grating optical multiplexer/demultiplexer are as follows. That is, the width W1 of the optical input waveguide 12 is 6.5 µm, the width W3 of the upper base of the trapezoidal waveguide 5 is 22.5 µm, the angle θ is 0.3°, and the width W4 of the lower base 6 of the trapezoidal waveguide 5 is 61.5 µm. In addition, the height of the core forming each waveguide and the relative refractive index difference are the same as those of the first embodiment.

As the result, almost same effect can be obtained by the second embodiment by means of the similar operation with the aforementioned first embodiment.

Five units of the arrayed waveguide grating optical multiplexer/demultiplexer (samples 1 to 5) related to the second embodiment composed as above are produced and the light which has undergone wavelength division multiplexing having a plurality of wavelengths different from each other by 200 GHz (actual wavelength spacing) at the band of wavelength 1.55 µm is inputted from the optical input waveguide 12. The crosstalk and the 1 dB bandwidth of the light outputted from the arrayed waveguide grating optical multiplexer/demultiplexer are evaluated thereby having obtained a result shown in Table 1. Incidentally, the adjacent crosstalk in Table 1 shows the result determined as the worst crosstalk within the range of adjacent wavelength of ±(1.6±0.6) nm from the central wavelength.

TABLE 1

|  | 1 dB bandwidth (nm) | adjacent crosstalk (dB) |
| --- | --- | --- |
| Sample 1 | 1.12 | −31 |
| Sample 2 | 1.10 | −33 |
| Sample 3 | 1.11 | −32 |
| Sample 4 | 1.13 | −34 |
| Sample 5 | 1.10 | −32 |

Consequently, it has been identified that the arrayed waveguide grating optical multiplexer/demultiplexer related to the second embodiment has the same 1 dB bandwidth and superior and stable adjacent crosstalk in comparison with the arrayed waveguide grating optical multiplexer/demultiplexer having an optical multiplex/demultiplex function of the optical frequency spacing 200 GHz at the 1.55 µm band.

Incidentally, the present invention is not restricted to the aforementioned each embodiment and various embodiments are available. For example, in the aforementioned embodiment, all the output ends of each optical input waveguide 12 are provided with the speaker-shaped waveguide 50 or the trapezoidal waveguide 5, however, one or more optical input waveguides may be provided with the speaker-shaped waveguide 50 or the trapezoidal waveguide 5.

In addition, a trapezoidal waveguide expanding its width toward the second slab waveguide 15 or a speaker-shaped waveguide having the trapezoidal waveguide concerned may be connected to the light input side of at least one output waveguide 16. Alternatively, a trapezoidal waveguide or a speaker-shaped waveguide may be provided at both of the output ends of one or more optical input waveguides 12 and the input ends of at least one optical output waveguide 16.

In case of providing a trapezoidal waveguide or a speaker-shaped waveguide at the optical output waveguide 16 side, the width of the trapezoidal waveguide or the speaker-shaped waveguide is made wider than that of the optical output waveguides 16.

Figure 6A:
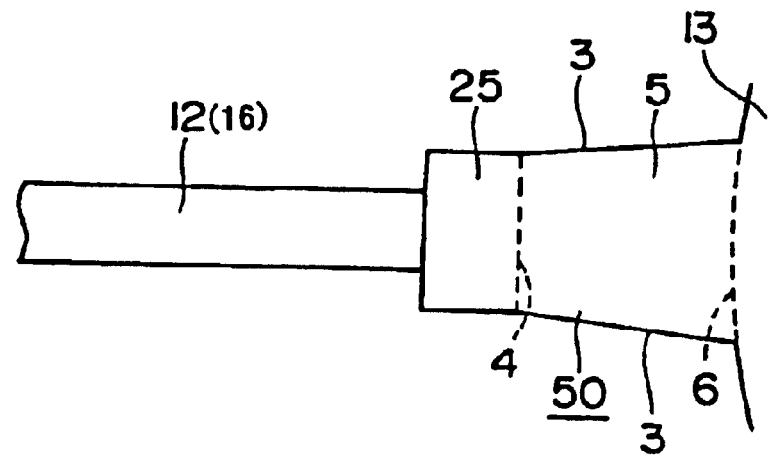
FIGS. 6A and 6B are illustrations showing a structural example of connecting part of an optical input waveguide and a first slab waveguide in the arrayed waveguide grating optical multiplexer/demultiplexer according to another embodiment of the present invention.

In addition, in the aforementioned first embodiment, the narrow straight waveguide 1 is interposed between the speaker-shaped waveguide 50 and the optical input waveguide 12 but the speaker-shaped waveguides 50 may be connected directly to the output ends of the optical input waveguides 12 or the input ends of the optical output waveguides 16 as shown in FIG. 6A.

Figure 6B:
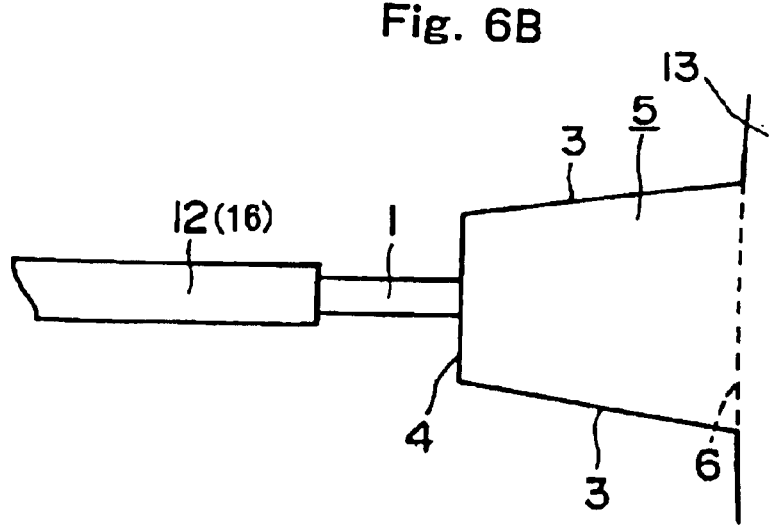
Figure 7A:
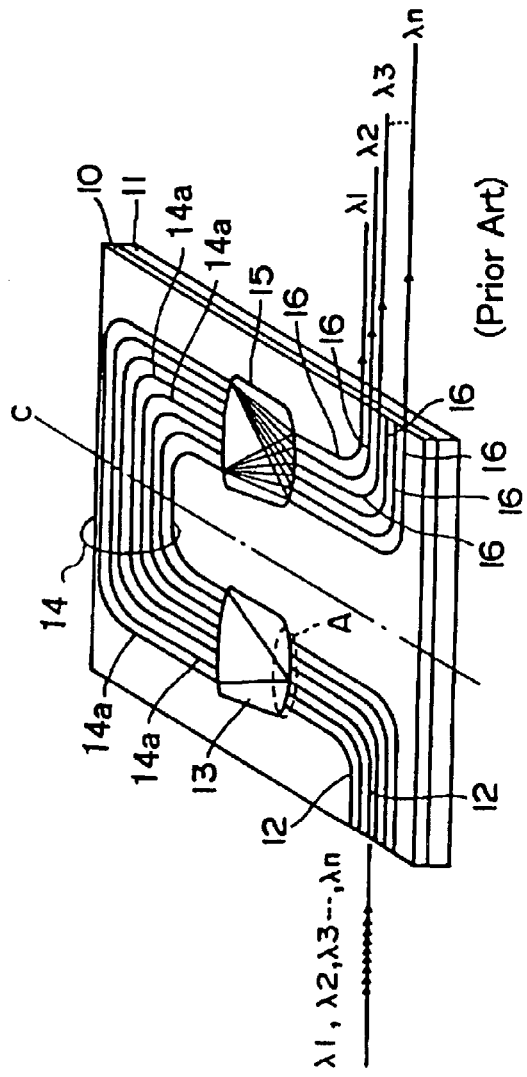
FIG. 7A is an illustration showing the structure of the conventional arrayed waveguide grating optical multiplexer/demultiplexer.
Figure 7B:
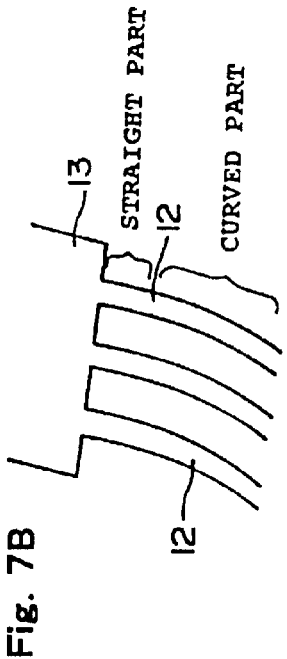
FIG. 7B is an illustration showing the enlarged area A part of FIG. 7A.

Further, in the second embodiment, the trapezoidal waveguides 5 are directly connected to the output ends of the optical input waveguides 12 but as shown in FIG. 6B, the narrow straight waveguide 1 may be connected between the optical input waveguides 12 and the trapezoidal waveguides 5 or the narrow straight waveguides 1 can be connected between the optical output waveguides 16 and the trapezoidal waveguides 5 even in the case of providing the trapezoidal waveguides 5 at the input ends of the optical output waveguides 16.

Further, the width, the length or the angle of the trapezoidal waveguide, the length or the width of the narrow straight waveguide, or the width or the length of the straight waveguide of equal width part are not limited in particular and they can be determined suitably. For example, by setting aforementioned each value according to the specifications of the arrayed waveguide grating optical multiplexer/demultiplexer, based on a simulation result of the optical amplitude distribution such as shown for example in FIG. 4, an arrayed waveguide grating optical multiplexer/demultiplexer having the advantageous effects like the aforementioned each embodiment can be obtained.

Further, in the above each embodiment, each optical output waveguide 16 is formed at a position enabling the output of a plurality of lights each having a different wavelength from each other by the designed wavelength spacing so as to demultiplex the light which has undergone wavelength division multiplexing inputted from one of the optical input waveguides 12 into a plurality of lights each having a wavelength of the optical frequency spacing from each other by a predetermined designed wavelength spacing thereby being outputted from each optical output waveguides 16, however, the optical output waveguides 16 may be formed at a position where only the light having a wavelength of substantially integral multiple spacing of the aforementioned designed wavelength spacing (e.g. every other waveguide in case of outputting the light of double wavelength spacing of the designed wavelength spacing like the aforementioned embodiment) can be outputted.

In the above embodiments of the present invention, the arrayed waveguide grating optical multiplexer/demultiplexer is configured to multiplex a plurality of lights having different wavelengths with a designed wavelength spacing and to demultiplex a light into a plurality of lights having different wavelengths with the designed wavelength spacing. The designed wavelength spacing is determined such that a value which is obtained by multiplying the designed wavelength spacing by an integer which is at least two is substantially equal to an actual wavelength spacing of lights which are actually input to or output from the multiplexer/demultiplexer. Accordingly, the adjacent crosstalk may improve.

Further, according to the arrayed waveguide grating optical multiplexer/demultiplexer according to the embodiments of the present invention, the flatness of the spectrum around the central wavelength of the arrayed waveguide grating optical multiplexer/demultiplexer is improved such that the shift of the central wavelength due to the aforementioned temperature change can be absorbed and moreover the adjacent crosstalk can be improved. Therefore, by applying the design of the aforementioned arrayed waveguide grating optical multiplexer/demultiplexer according to the embodiments of the present invention, the arrayed waveguide grating optical multiplexer/demultiplexer can be functioned without causing a problem, even if the central wavelength of the transmitting light is shifted to some extent, so that a high quality optical wavelength division multiplexing communications can be realized.

Furthermore, in the arrayed waveguide grating optical multiplexer/demultiplexer as one embodiment according to the present invention, by forming the substantially rectangular optical amplitude distribution forming waveguide by means of a trapezoidal waveguide having a width larger than that of the corresponding optical input waveguide or optical output waveguide and enlarging its width increasingly toward the corresponding slab waveguide, or by means of a straight waveguide of equal width part provided at the narrower end of the trapezoidal waveguide and having the same width as that of the narrower end, the optical amplitude distribution of the light propagating toward the corresponding slab waveguide can be changed from the Gaussian shape into the substantially rectangular shape so that the aforementioned effect can be securely achieved.

Further, in the arrayed waveguide grating optical multiplexer/demultiplexer according to the embodiments of the present invention, a construction in which a narrow straight waveguide having a width narrower than that of the corresponding optical input waveguide or optical output waveguide is provided between the substantially rectangular optical amplitude distribution forming waveguide and the optical input waveguide or the optical output waveguide corresponding thereto, even in the case that the optical input waveguide or the optical output waveguide is provided with a curved part and that the center position of the light intensity distribution is shifted from the lateral center of the optical input waveguide or the optical output waveguide as the light propagates through the curved part, the center position of the light intensity can be shot to the lateral center of the substantially rectangular optical amplitude distribution forming waveguide so that the light intensity distribution form of the light outputting from the substantially rectangular optical amplitude distribution forming waveguide can be made as a whole free from distortion.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An arrayed waveguide grating optical multiplexer/demultiplexer comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length;

a second slab waveguide; and a plurality of second optical waveguides connected to said arrayed waveguide via said second slab waveguide, wherein the optical multiplexer/demultiplexer is configured to multiplex a plurality of lights having different wavelengths with a designed wavelength spacing and to demultiplex a light into a plurality of lights having different wavelengths with said designed wavelength spacing, said designed wavelength spacing being determined such that a value which is obtained by multiplying said designed wavelength spacing by an integer which is at least two is substantially equal to an actual wavelength spacing of lights which are input to or output from the multiplexer/demultiplexer.

2. An arrayed waveguide grating optical multiplexer/demultiplexer according to claim 1, further comprising:

a substantially rectangular shape optical amplitude distribution forming waveguide that is provided between said at least one first optical waveguide and said first slab waveguide and/or between at least one of said plurality of second optical waveguides and said second slab waveguide, said substantially rectangular shape optical amplitude distribution forming waveguide being configured to change an optical amplitude distribution of light propagating from said at least one first optical waveguide toward the first slab waveguide or light propagating from said at least one of said plurality of second optical waveguides toward said second slab waveguide from a Gaussian shape to a substantially rectangular shape.

3. An arrayed waveguide grating optical multiplexer/demultiplexer according to claim 2, wherein said substantially rectangular shape optical amplitude distribution forming waveguide comprises a trapezoidal shape waveguide having an upper base and a lower base, the upper base having a width (W3) larger than a width (W1) of said at least one first optical waveguide or said at least one of said plurality of second optical waveguides and being connected to said at least one first optical waveguide or said at least one of said plurality of second optical waveguides, the lower base having a width (W4) larger than the width (W3) of the upper base and being connected to said first slab waveguide or said second slab waveguide.

4. An arrayed waveguide grating optical multiplexer/demultiplexer according to claim 3, wherein said trapezoidal waveguide is constructed such that a center of an intensity of light propagating through the at least one first optical waveguide or each of said plurality of second optical waveguides substantially coincides with a center of the upper base of the trapezoidal waveguide.

5. An arrayed waveguide grating optical multiplexer/demultiplexer according to claim 3, further comprising:

a narrow straight waveguide provided between the trapezoidal shape waveguide and said at least one first optical waveguide or said at least one of said plurality of second optical waveguides, a width (W2) of the narrow straight waveguide being smaller than the width (W1) of said at least one first optical waveguide or said at least one of said plurality of second optical waveguides.

6. An arrayed waveguide grating optical multiplexer/demultiplexer according to claim 2, wherein said substantially rectangular shape optical amplitude distribution forming waveguide comprises, a trapezoidal shape waveguide having an upper base and a lower base which is connected to said first slab waveguide or said second slab waveguide, and a straight waveguide equal width part which is provided at the upper base and which is connected to said at least one first optical waveguide or said at least one of said plurality of second optical waveguides.

7. An arrayed waveguide grating optical multiplexer/demultiplexer according to claim 6, wherein a width (W3) of said straight waveguide equal width part is substantially equal to a width of the upper base of said trapezoidal shape waveguide and is larger than a width (W1) of said at least one first optical waveguide or said at least one of said plurality of second optical waveguides.

8. An arrayed waveguide grating optical multiplexer/demultiplexer according to claim 6, further comprising:

a narrow straight waveguide provided between the straight waveguide equal width part and said at least one first optical waveguide or said at least one of said plurality of second optical waveguides, a width (W2) of the narrow straight waveguide being smaller than the width (W1) of said at least one first optical waveguide or said at least one of said plurality of second optical waveguides.

9. An arrayed waveguide grating optical multiplexer/demultiplexer according to claim 8, wherein a central axis of the narrow straight waveguide substantially coincides with a central axis of said at least one first optical waveguide or said at least one of said plurality of second optical waveguides.

10. An arrayed waveguide grating optical multiplexer/demultiplexer according to claim 2, wherein the optical multiplexer/demultiplexer includes a plurality of first optical waveguides, and wherein said substantially rectangular shape optical amplitude distribution forming waveguide is provided both between all of said plurality of first optical waveguides and said first slab waveguide and between all of said plurality of second optical waveguides and said second slab waveguide.

11. An arrayed waveguide grating optical multiplexer/demultiplexer according to claim 1, wherein said integer is equal to two.

12. A method for manufacturing an arrayed waveguide grating optical multiplexer/demultiplexer, comprising:

providing at least one first optical waveguide;

providing a first slab waveguide;

providing an arrayed waveguide connected to said at least one first optical waveguide via said first slab waveguide, said arrayed waveguide comprising a plurality of channel waveguides each of which has a different length;

providing a second slab waveguide;

providing a plurality of second optical waveguides connected to said arrayed waveguide via said second slab waveguide;

constructing the optical multiplexer/demultiplexer to multiplex a plurality of lights having different wavelengths with a designed wavelength spacing and to demultiplex a light into a plurality of lights having different wavelengths with said designed wavelength spacing; and determining said designed wavelength spacing such that a value which is obtained by multiplying said designed wavelength spacing by an integer which is at least two is substantially equal to an actual wavelength spacing of lights which are input to or output from the multiplexer/demultiplexer.

13. A method according to claim 12, further comprising:
providing a substantially rectangular shape optical amplitude distribution forming waveguide that is provided between said at least one first optical waveguide and said first slab waveguide and/or between at least one of said plurality of second optical waveguides and said second slab waveguide, said substantially rectangular shape optical amplitude distribution forming waveguide being configured to change an optical amplitude distribution of light propagating from said at least one first optical waveguide toward the first slab waveguide or light propagating from said at least one of said plurality of second optical waveguides toward said second slab waveguide from a Gaussian shape to a substantially rectangular shape.

14. A method according to claim 13, wherein said substantially rectangular shape optical amplitude distribution forming waveguide comprises a trapezoidal shape waveguide having an upper base and a lower base, the upper base having a width (W3) larger than a width (W1) of said at least one first optical waveguide or said at least one of said plurality of second optical waveguides and being connected to said at least one first optical waveguide or said at least one of said plurality of second optical waveguides, the lower base having a width (W4) larger than the width (W3) of the upper base and being connected to said first slab waveguide or said second slab waveguide.

15. A method according to claim 14, further comprising:
substantially aligning a center of an intensity of light propagating through the at least one first optical waveguide or each of said plurality of second optical waveguides with a center of the upper base of the trapezoidal waveguide.

16. A method according to claim 14, further comprising:
providing a narrow straight waveguide provided between the trapezoidal shape waveguide and said at least one first optical waveguide or said at least one of said plurality of second optical waveguides, a width (W2) of the narrow straight waveguide being smaller than the width (W1) of said at least one first optical waveguide or said at least one of said plurality of second optical waveguides.

17. A method according to claim 13, wherein said substantially rectangular shape optical amplitude distribution forming waveguide comprises,
a trapezoidal shape waveguide having an upper base and a lower base which is connected to said first slab waveguide or said second slab waveguide, and
a straight waveguide equal width part which is provided at the upper base and which is connected to said at least one first optical waveguide or said at least one of said plurality of second optical waveguides.

18. A method according to claim 17, wherein a width (W3) of said straight waveguide equal width part is substantially equal to a width of the upper base of said trapezoidal shape waveguide and is larger than a width (W1) of said at least one first optical waveguide or said at least one of said plurality of second optical waveguides.

19. A method according to claim 17, further comprising:
providing a narrow straight waveguide provided between the straight waveguide equal width part and said at least one first optical waveguide or said at least one of said plurality of second optical waveguides, a width (W2) of the narrow straight waveguide being smaller than the width (W1) of said at least one first optical waveguide or said at least one of said plurality of second optical waveguides.

20. A method according to claim 19, further comprising:
substantially aligning a central axis of the narrow straight waveguide with a central axis of said at least one first optical waveguide or said at least one of said plurality of second optical waveguides.

21. A method according to claim 13, wherein the optical multiplexer/demultiplexer includes a plurality of first optical waveguides, and wherein said substantially rectangular shape optical amplitude distribution forming waveguide is provided both between all of said plurality of first optical waveguides and said first slab waveguide and between all of said plurality of second optical waveguides and said second slab waveguide.

22. A method according to claim 12, wherein said integer is equal to two.

23. A method for using an arrayed waveguide grating optical multiplexer/demultiplexer, comprising:
providing the arrayed waveguide grating optical multiplexer/demultiplexer comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide; and
a plurality of second optical waveguides connected to said arrayed waveguide via said second slab waveguide;
the optical multiplexer/demultiplexer being configured to multiplex a plurality of lights having different wavelengths with a designed wavelength spacing and to demultiplex a light into a plurality of lights having different wavelengths with said designed wavelength spacing; and
inputting a plurality of lights having different wavelengths with an actual wavelength spacing to said at least one first optical waveguide, or outputting a plurality of lights having different wavelengths with said actual wavelength spacing from said plurality of second optical waveguides, said actual wavelength spacing being substantially equal to a value obtained by multiplying said designed wavelength spacing by an integer which is at least two.

* * * * *